(12) United States Patent
Lin (10) Patent No.: US 12,510,139 B2
(45) Date of Patent: Dec. 30, 2025

(54) MANUAL SCREW SHAFT DRIVING DEVICE (71) Applicant: LIN GWO TSAIR ENTERPRISE CO., LTD., Tainan (TW)

(72) Inventor: Yu-Hao Lin, Tainan (TW)

(73) Assignee: LIN GWO TSAIR ENTERPRISE CO., LTD., Tainan (TW)

( * ) Notice: Subject to any disclaimer, the term of this patent is extended or adjusted under 35 U.S.C. 154(b) by 132 days.

(21) Appl. No.: 18/658,114

(22) Filed: May 8, 2024

(65) Prior Publication Data
US 2025/0180100 A1   Jun. 5, 2025

(51) Int. Cl.
*F16H 25/20* (2006.01)
*E06B 9/322* (2006.01)

(52) U.S. Cl.
CPC ......... *F16H 25/2025* (2013.01); *E06B 9/322* (2013.01)

(58) Field of Classification Search
CPC .... E06B 9/322; E06B 2009/3222; E06B 9/78; F16H 2025/2071; F16H 25/20
See application file for complete search history.

(56) References Cited

U.S. PATENT DOCUMENTS 8,205,658 B1 * 6/2012 Lin .......................... E06B 9/40
160/320

* cited by examiner

*Primary Examiner* — Gregory Robert Weber
(74) *Attorney, Agent, or Firm* — Christopher R. Christenson; Kelly, Holt & Christenson, P.L.L.C.

(57) ABSTRACT

Disclosed is a manual screw shaft driving device, comprising: a screw shaft, a driving member, a front one-way bearing, a rear one-way bearing, a front teeth member, a rear teeth member, a gripping member and a driving direction switching member, wherein while the driving direction switching member is switched to a first switching position, the driving member is not rotatable in a second rotation direction and is rotatable in the first rotation direction, and while the driving direction switching member is switched to a second switching position, the driving member is not rotatable in the first rotation direction and is rotatable in the second rotation direction, thereby enabling the screw shaft to be driven to rotate only in the first rotation direction or the second rotation direction by a manual forward and backward sliding operation of the gripping member.

9 Claims, 8 Drawing Sheets

MANUAL SCREW SHAFT DRIVING DEVICE

FIELD OF THE INVENTION

The present invention relates to a screw shaft driving device, and more particularly relates to a manual screw shaft driving device.

BACKGROUND OF THE INVENTION

In buildings, curtains or awnings are used to block sunlight and ultraviolet rays to lower room temperature and provide a cool place. Common operating tools for curtains or awnings include, for example, pull cords and hand cranks, through which the opening and closing or tilting angle of the curtains or awnings can be adjusted.

Among the above-mentioned operating tools, the pull cords have the advantage of simple operation, but have the risk of getting entangled and causing danger. Furthermore, although the hand cranks also have the advantage of simple operation, there is the problem that a conventional hand crank requires an operator to use both hands to operate it.

SUMMARY OF THE INVENTION

Accordingly, one objective of the present invention is to provide a manual screw shaft driving device to solve technical problems in a prior art.

In order to overcome the technical problems in the prior art, the present invention provides a manual screw shaft driving device, comprising: a screw shaft, which is a rod-shaped member extending on an axis, being formed with screw threads around an outer peripheral surface of the screw shaft; a driving member, which has a tubular shape, being formed with driving threads on an internal surface of the driving member, the driving threads being corresponding in shape and spirally fitted to the screw threads to enable the driving member to relatively slidably and rotatably fit around the screw shaft along the axis; a front one-way bearing, wherein an inner ring of the front one-way bearing is fixedly fitted around the driving member to support the driving member on the axis, the inner ring of the front one-way bearing is rotatable in a first rotation direction in relation to an outer ring of the front one-way bearing, and the inner ring of the front one-way bearing is not rotatable in a second rotation direction, whose rotating direction is opposite to the first rotation direction, in relation to the outer ring of the front one-way bearing; a rear one-way bearing, which is provided behind the front one-way bearing, wherein an inner ring of the rear one-way bearing is fixedly fitted around the driving member to support the driving member on the axis, the inner ring of the rear one-way bearing is rotatable in the second rotation direction in relation to an outer ring of the rear one-way bearing, and the inner ring of the rear one-way bearing is not rotatable in the first rotation direction in relation to the outer ring of the rear one-way bearing; a front teeth member, fixed to the outer ring of the front one-way bearing; a rear teeth member, fixed to the outer ring of the rear one-way bearing; a gripping member, which has a tubular shape, being formed with a sliding and rotating space inside the gripping member, wherein the driving member, the front one-way bearing and the rear one-way bearing are rotatably disposed in the sliding and rotating space such that the driving member is rotatable in the first rotation direction in a manner that the inner ring of the front one-way bearing, the inner ring of the rear one-way bearing and the outer ring of the rear one-way bearing rotate integrally with the driving member, and the driving member is rotatable in the second rotation direction in a manner that the inner ring of the front one-way bearing, the outer ring of the front one-way bearing and the inner ring of the rear one-way bearing rotate integrally with the driving member; and a driving direction switching member, disposed at the gripping member and having a front pawl portion corresponding to the front teeth member and a rear pawl portion corresponding to rear teeth member, wherein the driving direction switching member is disposed to switch between a first switching position and a second switching position; wherein while the driving direction switching member is switched to the first switching position, the front pawl portion engages to the front teeth member so that the outer ring of the front one-way bearing is fixed to the gripping member through the front teeth member such that the driving member becomes a first state in which the driving member is not rotatable in the second rotation direction and is rotatable in the first rotation direction, in the first state, when the gripping member slides forwardly and backwardly in relation to the screw shaft, the screw shaft is driven to rotate in the first rotation direction in relation to the gripping member by a screw mechanism between the screw threads and the driving threads of the driving member since the driving member is not rotatable in the second rotation direction and the driving member rotates in the first rotation direction in relation to the screw shaft, thereby not driving the screw shaft to rotate in the second rotation direction, wherein while the driving direction switching member is switched to the second switching position, the rear pawl portion engages to the rear teeth member so that the outer ring of the rear one-way bearing is fixed to the gripping member through the rear teeth member such that the driving member becomes a second state in which the driving member is not rotatable in the first rotation direction and is rotatable in the second rotation direction, in the second state, when the gripping member slides forwardly and backwardly in relation to the screw shaft, the screw shaft is driven to rotate in the second rotation direction in relation to the gripping member by the screw mechanism between the screw threads and the driving threads of the driving member since the driving member is not rotatable in the first rotation direction and the driving member rotates in the second rotation direction in relation to the screw shaft, thereby not driving the screw shaft to rotate in the first rotation direction.

In one embodiment of the present invention, the manual screw shaft driving device is provided, wherein the front teeth member has a plurality of teeth arranged around an outer peripheral surface of the outer ring of the front one-way bearing.

In one embodiment of the present invention, the manual screw shaft driving device is provided, wherein the rear teeth member has a plurality of teeth arranged around an outer peripheral surface of the outer ring of the rear one-way bearing.

In one embodiment of the present invention, the manual screw shaft driving device is provided further comprising a front bearing and a rear bearing, wherein the front bearing is coaxially arranged in front of the front one-way bearing, the rear bearing is coaxially arranged behind the rear one-way bearing, and the driving member is provided passing through the sliding and rotating space in a manner of being supported by the front bearing and the rear bearing.

In one embodiment of the present invention, the manual screw shaft driving device is provided, wherein the driving member includes a front driving portion and a rear driving portion separated from each other, the inner ring of the front one-way bearing is fixedly fitted around an outer peripheral surface of the front driving portion, and the inner ring of the rear one-way bearing is fixedly fitted around an outer peripheral surface of the rear driving portion.

In one embodiment of the present invention, the manual screw shaft driving device is provided, further comprising a front bearing, a rear bearing and an intermediate bearing, wherein the front bearing is coaxially arranged in front of the front one-way bearing, the rear bearing is coaxially arranged behind the rear one-way bearing, the intermediate bearing is coaxially arranged between the front one-way bearing and the rear one-way bearing, the front driving portion is provided passing through the sliding and rotating space in a manner of being supported by the front bearing and the intermediate bearing, and the rear driving portion is provided passing through the sliding and rotating space in a manner of being supported by the intermediate bearing and the rear bearing.

In one embodiment of the present invention, the manual screw shaft driving device is provided, wherein the screw shaft is further provided with a cap portion fixed at a rear end of the screw shaft such that when the gripping member slides backwardly in relation to the screw shaft, the screw shaft is prevented from coming off from the gripping member by the cap portion forwardly pressing against the gripping member.

In one embodiment of the present invention, the manual screw shaft driving device is provided, wherein the driving direction switching member further includes a body, a pivot and a positioning element, the body has a first end and a second end opposite to the first end, the pivot and the positioning element are arranged between the first end and the second end, the positioning element is provided protruding from a bottom surface of the body, the pivot is connected to the gripping member such that the driving direction switching member is pivotally connected to the gripping member by the pivot, when the driving direction switching member is switched to the first switching position, the positioning element abuts against a rear groove formed in the gripping member to maintain the driving direction switching member in the first switching position, and when the driving direction switching member is switched to the second switching position, the positioning element abuts against a front groove formed in the gripping member to maintain the driving direction switching member in the second switching position.

In one embodiment of the present invention, the manual screw shaft driving device is provided, wherein the positioning element includes an elastic element and a ball.

With the technical means adopted by the present invention, the manual screw shaft driving device of the present invention enables the screw shaft to rotate only in a desired rotation direction by switching the driving direction switching member between the first switching position and the second switching position. Furthermore, the manual screw shaft driving device of the present invention enables an operator to perform a manual forward and backward sliding operation and switching of rotation direction of the screw shaft with one hand. Moreover, the manual screw shaft driving device of the present invention enables the operator to rotate the screw shaft only in the desired rotation direction by the changeless manual forward and backward sliding operation using only one hand so that opening and closing or tilting angle of curtains or awnings can be adjusted by only one hand.

DETAILED DESCRIPTION OF THE PREFERRED EMBODIMENTS

The preferred embodiments of the present invention are described in detail with reference to FIG. 1 to FIG. 8. The description is used for explaining the embodiments of the present invention only, but not for limiting the scope of the claims.

As shown in FIG. 1 to FIG. 8, a manual screw shaft driving device 100 according to one embodiment of the present invention comprises: a screw shaft 10, a driving member 20, a front one-way bearing 30, a rear one-way bearing 40, a front teeth member 31, a rear teeth member 32, a gripping member 50 and a driving direction switching member 60.

Specifically, the screw shaft 10, which is a rod-shaped member extending on an axis, is formed with screw threads 11 around an outer peripheral surface of the screw shaft 10.

The driving member 20, which has a tubular shape, is formed with driving threads 21 on an internal surface of the driving member 20, the driving threads 21 are corresponding in shape and spirally fitted to the screw threads 11 to enable the driving member 20 to relatively slidably and rotatably fit around the screw shaft 10 along the axis.

An inner ring of the front one-way bearing 30 is fixedly fitted around the driving member 20 to support the driving member 20 on the axis, wherein the inner ring of the front one-way bearing 30 is rotatable in a first rotation direction in relation to an outer ring of the front one-way bearing 30, and the inner ring of the front one-way bearing 30 is not rotatable in a second rotation direction, whose rotating direction is opposite to the first rotation direction, in relation to the outer ring of the front one-way bearing 30.

The rear one-way bearing 40 is provided behind the front one-way bearing 30, wherein an inner ring of the rear one-way bearing 40 is fixedly fitted around the driving member 20 to support the driving member 20 on the axis, the inner ring of the rear one-way bearing 40 is rotatable in the second rotation direction in relation to an outer ring of the rear one-way bearing 40, and the inner ring of the rear one-way bearing 40 is not rotatable in the first rotation direction in relation to the outer ring of the rear one-way bearing 40.

The front teeth member 31 is fixed to the outer ring of the front one-way bearing 30, and the rear teeth member 41 is fixed to the outer ring of the rear one-way bearing 40.

The gripping member 50, which has a tubular shape, is formed with a sliding and rotating space S inside the gripping member 50, wherein the driving member 20, the front one-way bearing 30 and the rear one-way bearing 40 are rotatably disposed in the sliding and rotating space S such that the driving member 20 is rotatable in the first rotation direction in a manner that the inner ring of the front one-way bearing 30, the inner ring of the rear one-way bearing 40 and the outer ring of the rear one-way bearing 40 rotate integrally with the driving member 20, and the driving member 20 is rotatable in the second rotation direction in a manner that the inner ring of the front one-way bearing 30, the outer ring of the front one-way bearing 30 and the inner ring of the rear one-way bearing 40 rotate integrally with the driving member 20.

The driving direction switching member 60 is disposed at the gripping member 50 and has a front pawl portion 61 corresponding to the front teeth member 31 and a rear pawl portion 62 corresponding to rear teeth member 41, wherein the driving direction switching member 60 is disposed to switch between a first switching position and a second switching position.

Figure 3:
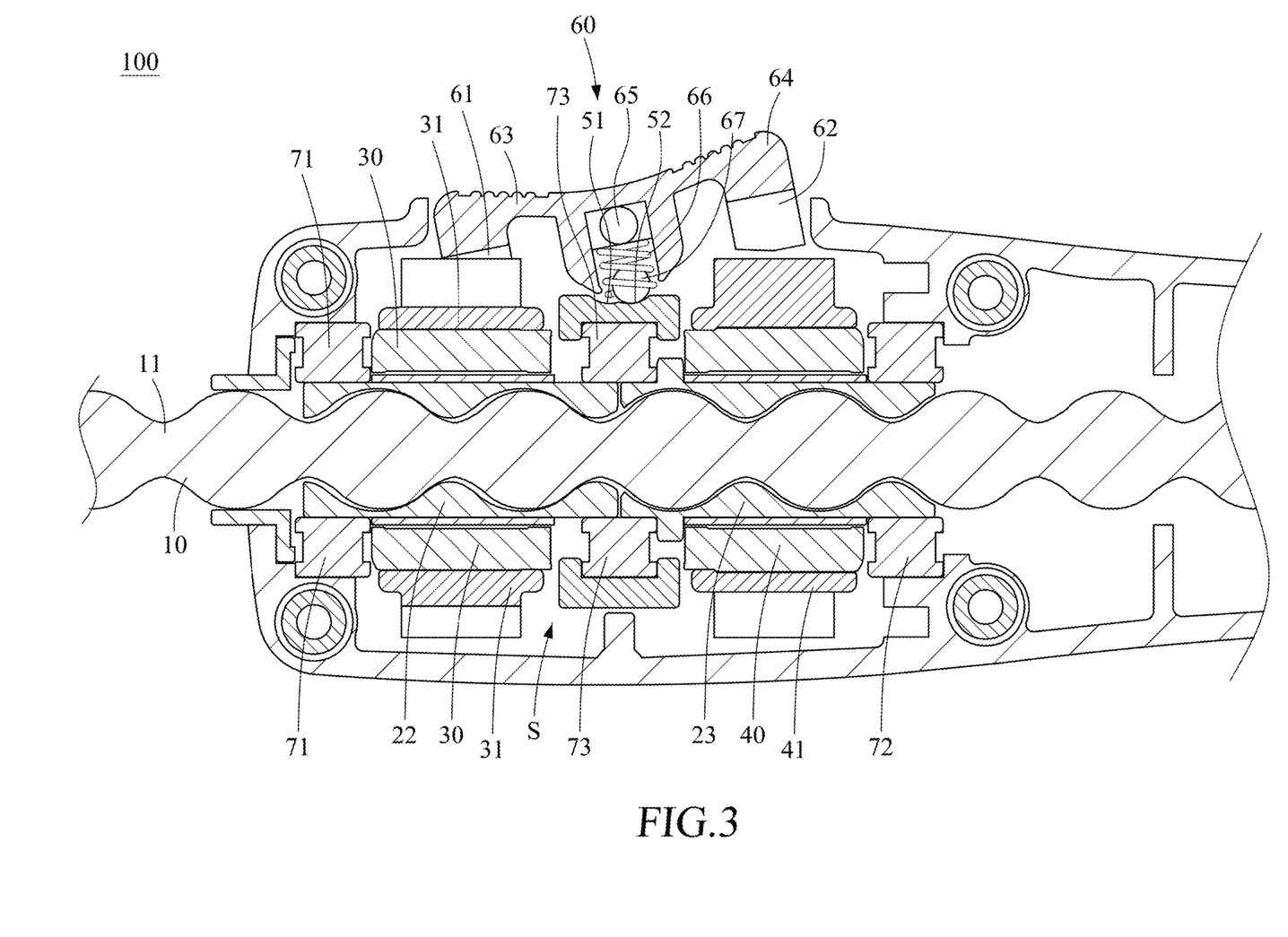
FIG. 3 is a schematic cross-section view of the manual screw shaft driving device according to the embodiment of the present invention when a driving direction switching member is in a first switching position.
Figure 4:
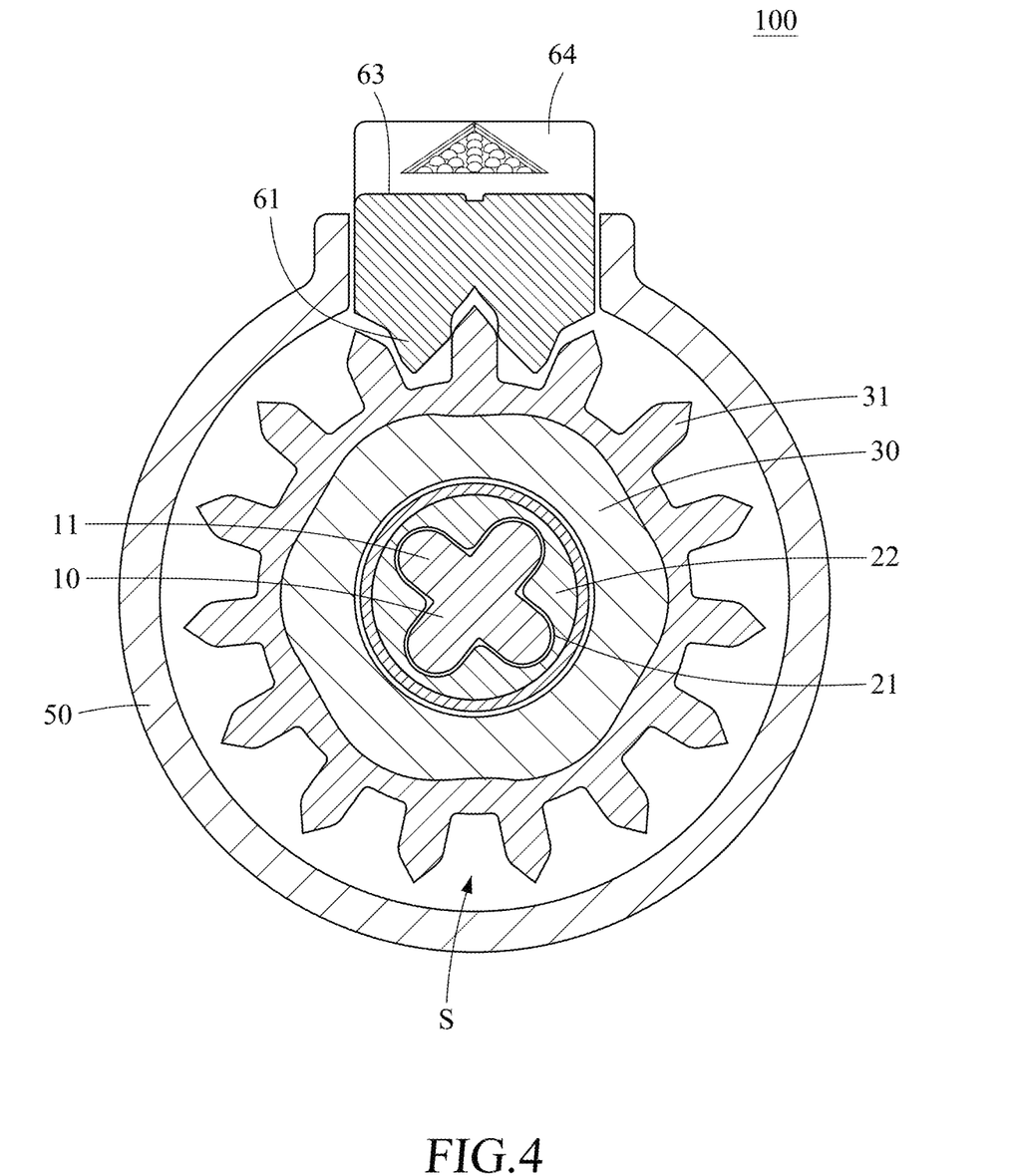
FIG. 4 is a schematic cross-section view of the manual screw shaft driving device according to the embodiment of the present invention when the driving direction switching member is in the first switching position.
Figure 5:
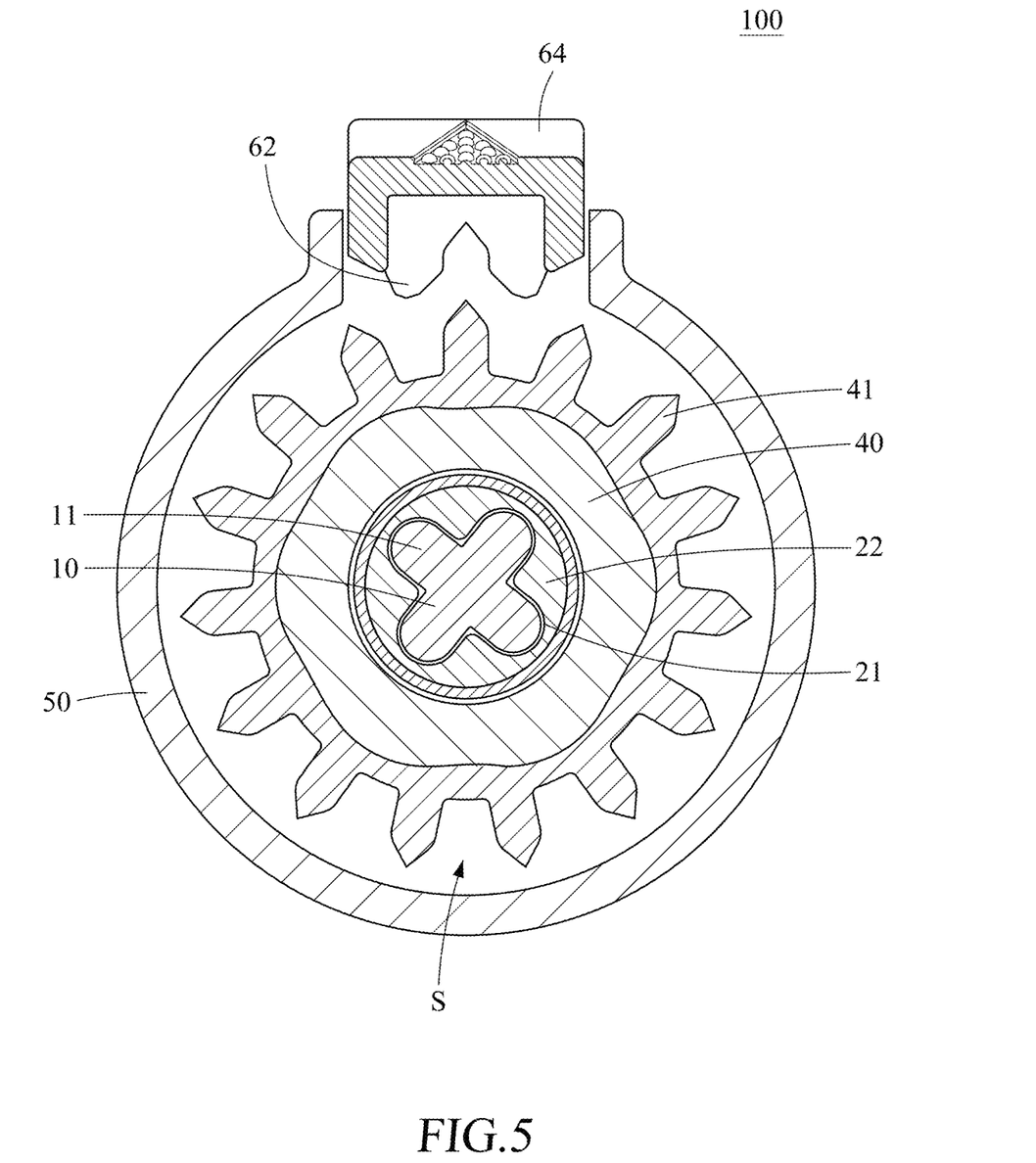
FIG. 5 is a schematic cross-section view of the manual screw shaft driving device according to the embodiment of the present invention when the driving direction switching member is in the first switching position.

As shown in FIG. 3 to FIG. 5, in the manual screw shaft driving device 100 according to one embodiment of the present invention, while the driving direction switching member 60 is switched to the first switching position, the front pawl portion 61 engages to the front teeth member 31 so that the outer ring of the front one-way bearing 30 is fixed to the gripping member 50 through the front teeth member 31 such that the driving member 20 becomes a first state in which the driving member 20 is not rotatable in the second rotation direction and is rotatable in the first rotation direction. In the first state, when the gripping member 50 slides forwardly and backwardly in relation to the screw shaft 10, the screw shaft 10 is driven to rotate in the first rotation direction in relation to the gripping member 50 by a screw mechanism between the screw threads 11 and the driving threads 21 of the driving member 20 since the driving member 20 is not rotatable in the second rotation direction and the driving member 20 rotates in the first rotation direction in relation to the screw shaft 10, thereby not driving the screw shaft 10 to rotate in the second rotation direction.

Figure 6:
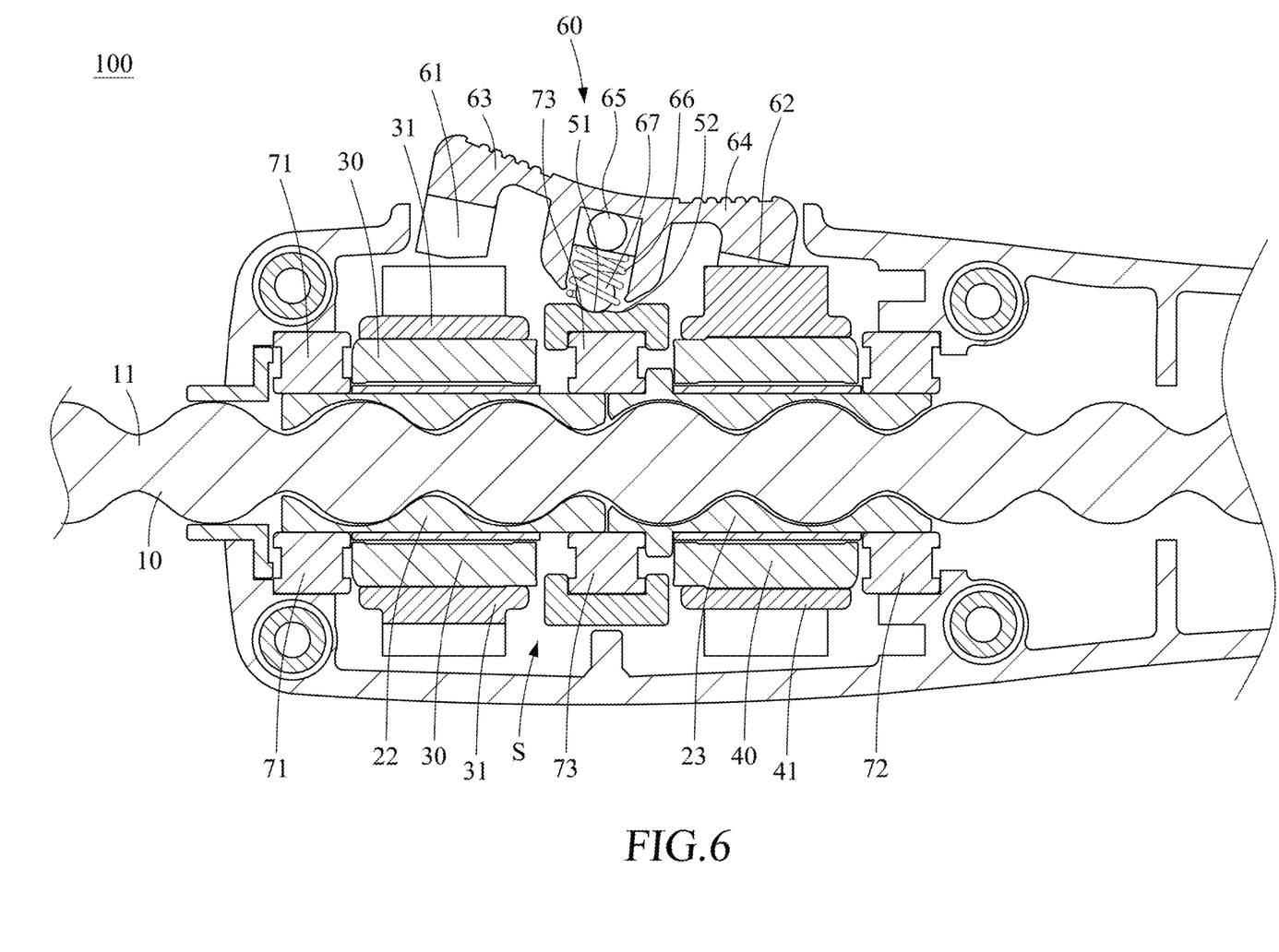
FIG. 6 is a schematic cross-section view of the manual screw shaft driving device according to the embodiment of the present invention when the driving direction switching member is in a second switching position.
Figure 7:
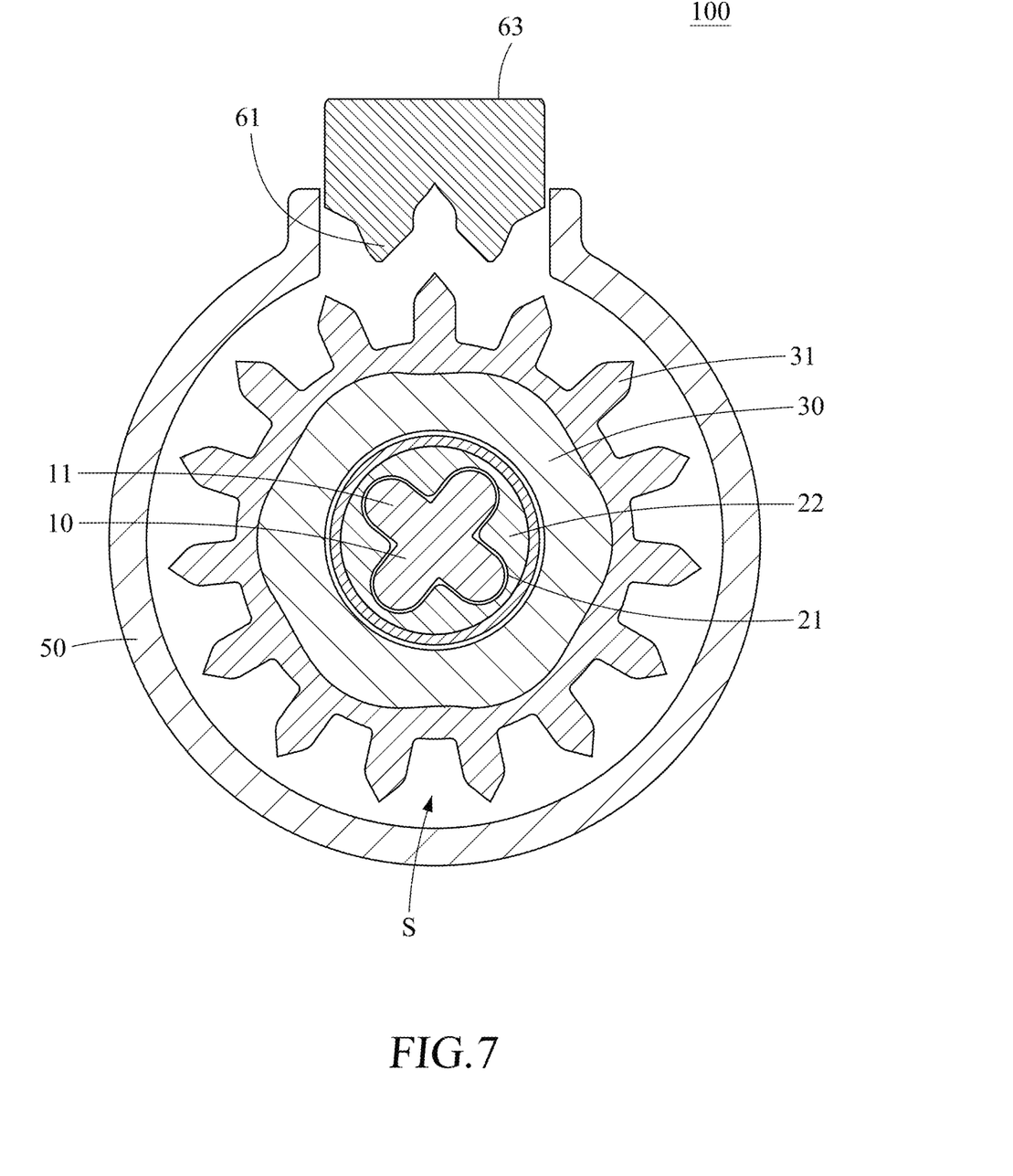
FIG. 7 is a schematic cross-section view of the manual screw shaft driving device according to the embodiment of the present invention when the driving direction switching member is in the second switching position.
Figure 8:
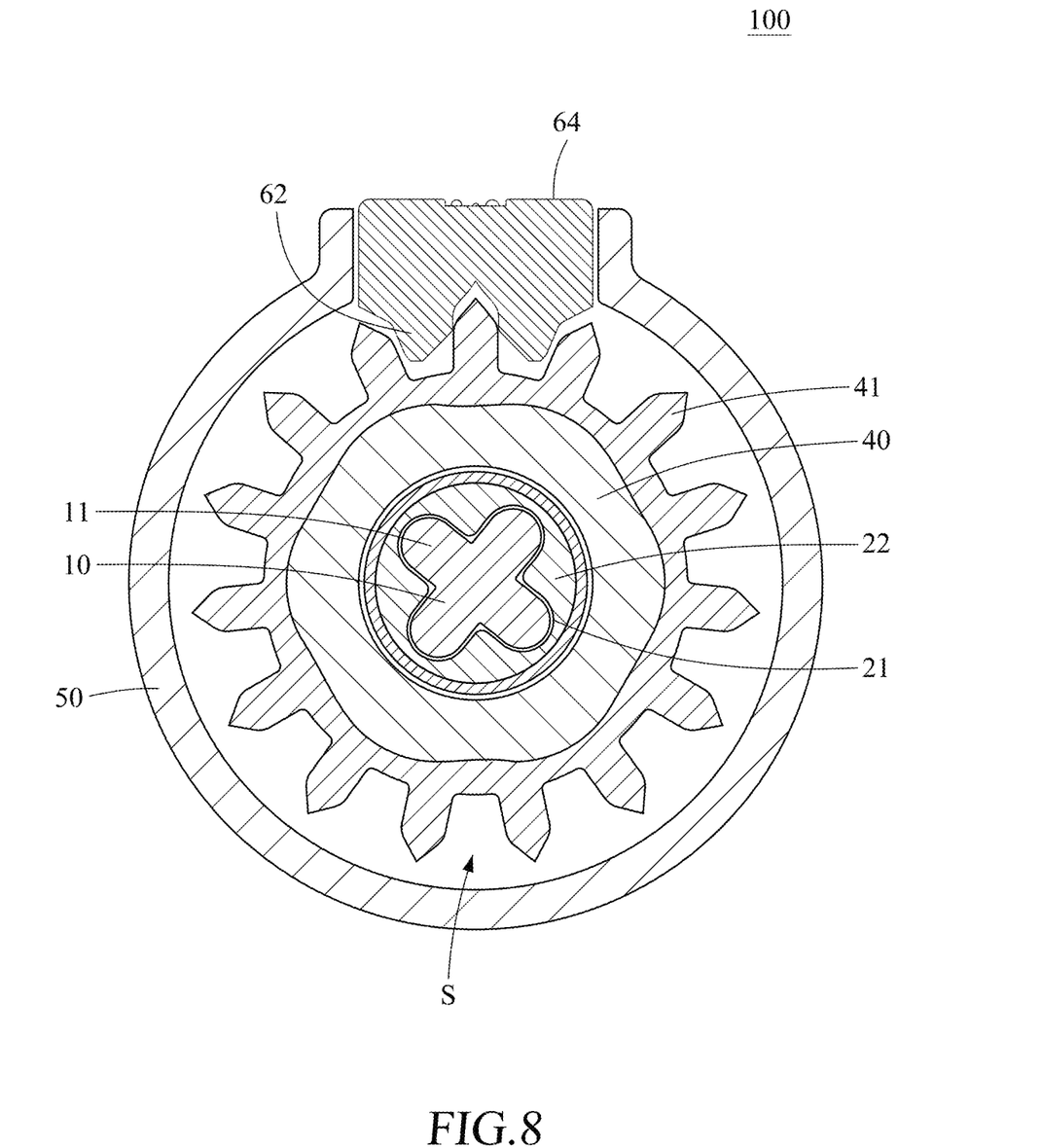
FIG. 8 is a schematic cross-section view of the manual screw shaft driving device according to the embodiment of the present invention when the driving direction switching member is in the second switching position.

As shown in FIG. 6 to FIG. 8, in the manual screw shaft driving device 100 according to one embodiment of the present invention, while the driving direction switching member 60 is switched to the second switching position, the rear pawl portion 62 engages to the rear teeth member 41 so that the outer ring of the rear one-way bearing 40 is fixed to the gripping member 50 through the rear teeth member 41 such that the driving member 20 becomes a second state in which the driving member 20 is not rotatable in the first rotation direction and is rotatable in the second rotation direction. In the second state, when the gripping member 50 slides forwardly and backwardly in relation to the screw shaft 10, the screw shaft 10 is driven to rotate in the second rotation direction in relation to the gripping member 50 by the screw mechanism between the screw threads 11 and the driving threads 21 of the driving member 20 since the driving member 20 is not rotatable in the first rotation direction and the driving member 20 rotates in the second rotation direction in relation to the screw shaft 10, thereby not driving the screw shaft 10 to rotate in the first rotation direction.

As shown in FIG. 1 to FIG. 4, FIG. 6 and FIG. 7, in the manual screw shaft driving device 100 according to one embodiment of the present invention, the front teeth member 31 has a plurality of teeth arranged around an outer peripheral surface of the outer ring of the front one-way bearing 30.

As shown in FIG. 1 to FIG. 3, FIG. 5 and FIG. 8, in the manual screw shaft driving device 100 according to one embodiment of the present invention, the rear teeth member 41 has a plurality of teeth arranged around an outer peripheral surface of the outer ring of the rear one-way bearing 40.

Figure 1:
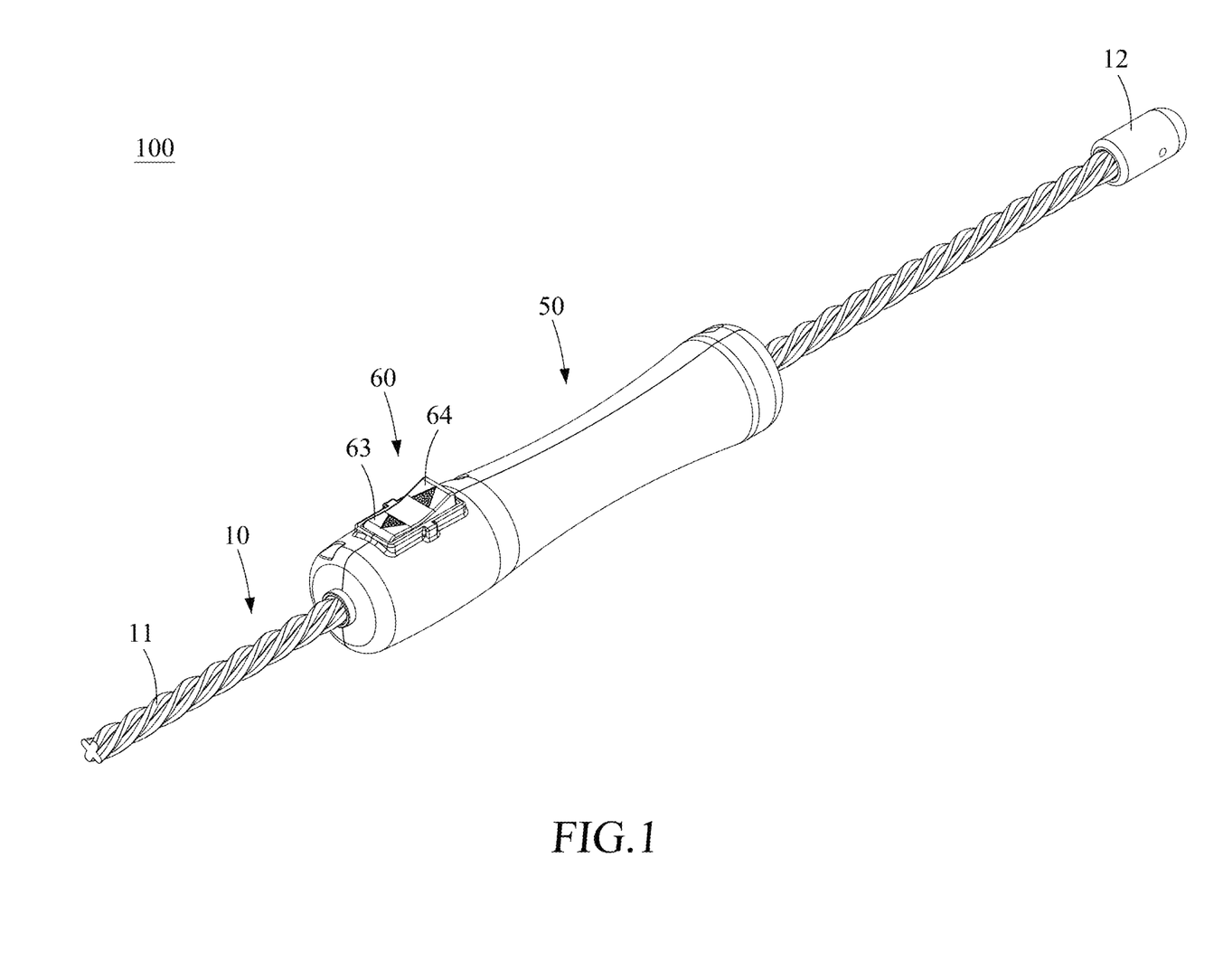
FIG. 1 is a schematic perspective view illustrating a manual screw shaft driving device according to one embodiment of the present invention.

As shown in FIG. 1, FIG. 3 and FIG. 6, in the manual screw shaft driving device 100 according to one embodiment of the present invention, the manual screw shaft driving device 100 further comprises a front bearing 71 and a rear bearing 72, wherein the front bearing 71 is coaxially arranged in front of the front one-way bearing 30, the rear bearing 72 is coaxially arranged behind the rear one-way bearing 40, and the driving member 20 is provided passing through the sliding and rotating space S in a manner of being supported by the front bearing 71 and the rear bearing 72.

Figure 2:
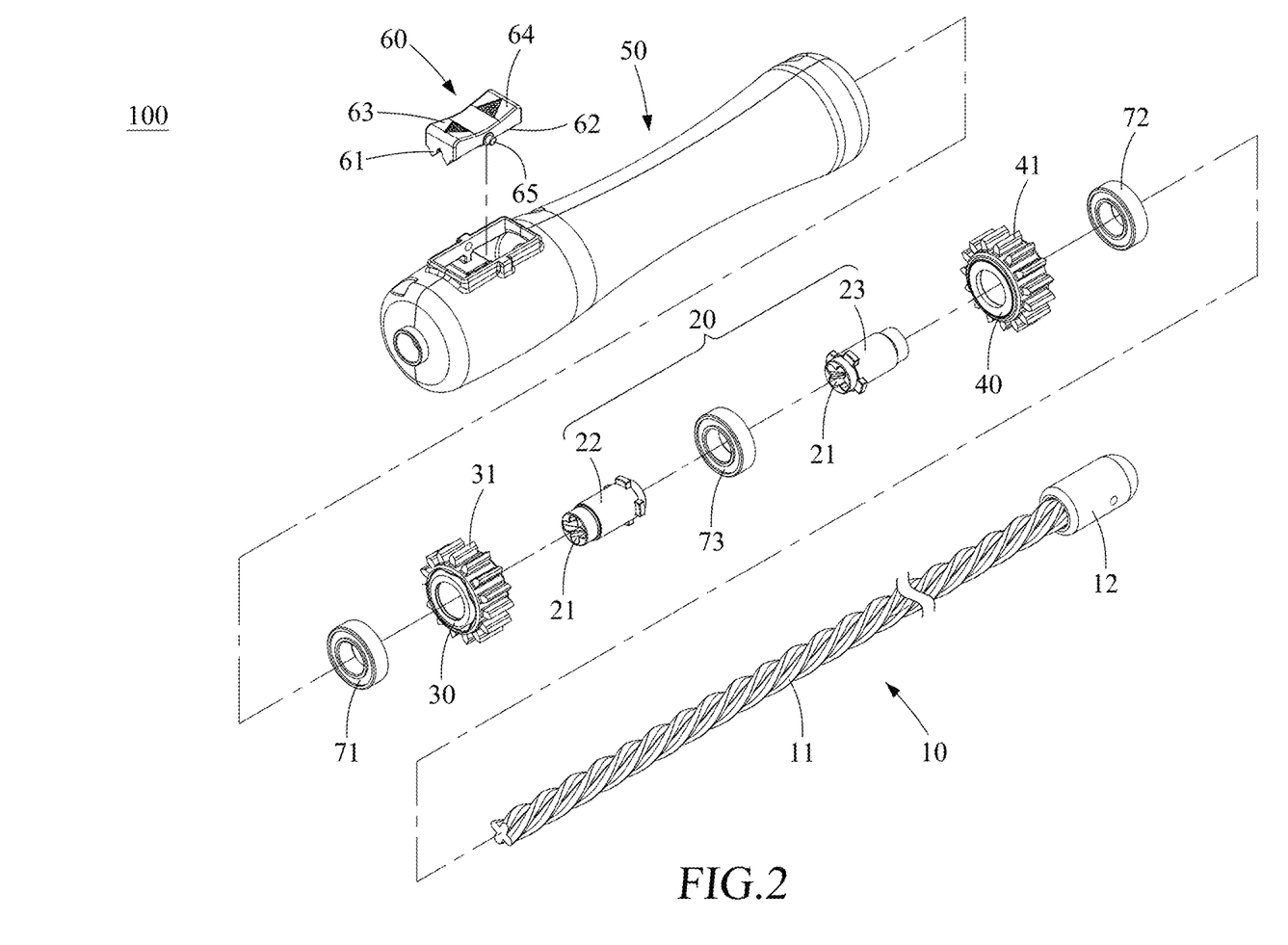
FIG. 2 is a schematic exploded view illustrating the manual screw shaft driving device according to the embodiment of the present invention.

As shown in FIG. 2, FIG. 3 and FIG. 6, the driving member 20 includes a front driving portion 22 and a rear driving portion 23 separated from each other, the inner ring of the front one-way bearing 30 is fixedly fitted around an outer peripheral surface of the front driving portion 22, and the inner ring of the rear one-way bearing 40 is fixedly fitted around an outer peripheral surface of the rear driving portion 23.

Furthermore, in this embodiment, the manual screw shaft driving device 100 according to the present invention further comprises an intermediate bearing 73, wherein the intermediate bearing 73 is coaxially arranged between the front one-way bearing 30 and the rear one-way bearing 40, the front driving portion 22 is provided passing through the sliding and rotating space S in a manner of being supported by the front bearing 71 and the intermediate bearing 73, and the rear driving portion 23 is provided passing through the sliding and rotating space S in a manner of being supported by the intermediate bearing 73 and the rear bearing 72.

Furthermore, the screw shaft 10 is further provided with a cap portion 12 fixed at a rear end of the screw shaft 10 such that when the gripping member 50 slides backwardly in relation to the screw shaft 10, the screw shaft 10 is prevented from coming off from the gripping member 50 by the cap portion 12 forwardly pressing against the gripping member 50.

Furthermore, the driving direction switching member 60 further includes a body, a pivot 65 and a positioning element, the body has a first end 63 and a second end 64 opposite to the first end 63, the pivot 65 and the positioning element are arranged between the first end 63 and the second end 64, the positioning element is provided protruding from a bottom surface of the body, the pivot 65 is connected to the gripping member 50 such that the driving direction switching member 60 is pivotally connected to the gripping member 50 by the pivot 65, when the driving direction switching member 60 is switched to the first switching position, the positioning element abuts against a rear groove 52 formed in the gripping member 50 to maintain the driving direction switching member 60 in the first switching position, and when the driving direction switching member 60 is switched to the second switching position, the positioning element abuts against a front groove 51 formed in the gripping member 50 to maintain the driving direction switching member 60 in the second switching position.

Furthermore, the positioning element includes an elastic element 66 and a ball 67. In this embodiment, the elastic element 66 is a compression spring and the ball 67 is a steel ball. Of course, the present invention is not limited to this, and the elastic element 66 and the ball 67 may be any elements as long as that the driving direction switching member 60 can be stably switched to the first switching position or the second switching position.

With the technical means adopted by the present invention, the manual screw shaft driving device 100 of the present invention enables the screw shaft 10 to rotate only in a desired rotation direction by switching the driving direction switching member 60 between the first switching position and the second switching position. Furthermore, the manual screw shaft driving device 100 of the present invention enables an operator to perform a manual forward and backward sliding operation and switching of rotation direction of the screw shaft with one hand. Moreover, the manual screw shaft driving device 100 of the present invention enables the operator to rotate the screw shaft 10 only in the desired rotation direction by the changeless manual forward and backward sliding operation using only one hand so that opening and closing or tilting angle of curtains or awnings can be adjusted by only one hand.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A manual screw shaft driving device, comprising:
   a screw shaft, which is a rod-shaped member extending on an axis, being formed with screw threads around an outer peripheral surface of the screw shaft;
   a driving member, which has a tubular shape, being formed with driving threads on an internal surface of the driving member, the driving threads being corresponding in shape and spirally fitted to the screw threads to enable the driving member to relatively slidably and rotatably fit around the screw shaft along the axis;
   a front one-way bearing, wherein an inner ring of the front one-way bearing is fixedly fitted around the driving member to support the driving member on the axis, the inner ring of the front one-way bearing is rotatable in a first rotation direction in relation to an outer ring of the front one-way bearing, and the inner ring of the front one-way bearing is not rotatable in a second rotation direction, whose rotating direction is opposite to the first rotation direction, in relation to the outer ring of the front one-way bearing;
   a rear one-way bearing, which is provided behind the front one-way bearing, wherein an inner ring of the rear one-way bearing is fixedly fitted around the driving member to support the driving member on the axis, the inner ring of the rear one-way bearing is rotatable in the second rotation direction in relation to an outer ring of the rear one-way bearing, and the inner ring of the rear one-way bearing is not rotatable in the first rotation direction in relation to the outer ring of the rear one-way bearing;
   a front teeth member, fixed to the outer ring of the front one-way bearing;
   a rear teeth member, fixed to the outer ring of the rear one-way bearing;
   a gripping member, which has a tubular shape, being formed with a sliding and rotating space inside the gripping member, wherein the driving member, the front one-way bearing and the rear one-way bearing are rotatably disposed in the sliding and rotating space such that the driving member is rotatable in the first rotation direction in a manner that the inner ring of the front one-way bearing, the inner ring of the rear one-way bearing and the outer ring of the rear one-way bearing rotate integrally with the driving member, and the driving member is rotatable in the second rotation direction in a manner that the inner ring of the front one-way bearing, the outer ring of the front one-way bearing and the inner ring of the rear one-way bearing rotate integrally with the driving member; and
   a driving direction switching member, disposed at the gripping member and having a front pawl portion corresponding to the front teeth member and a rear pawl portion corresponding to rear teeth member, wherein the driving direction switching member is disposed to switch between a first switching position and a second switching position;
   wherein while the driving direction switching member is switched to the first switching position, the front pawl portion engages to the front teeth member so that the outer ring of the front one-way bearing is fixed to the gripping member through the front teeth member such that the driving member becomes a first state in which the driving member is not rotatable in the second rotation direction and is rotatable in the first rotation direction,
   in the first state, when the gripping member slides forwardly and backwardly in relation to the screw shaft, the screw shaft is driven to rotate in the first rotation direction in relation to the gripping member by a screw mechanism between the screw threads and the driving threads of the driving member since the driving member is not rotatable in the second rotation direction and the driving member rotates in the first rotation direction in relation to the screw shaft, thereby not driving the screw shaft to rotate in the second rotation direction,
   wherein while the driving direction switching member is switched to the second switching position, the rear pawl portion engages to the rear teeth member so that the outer ring of the rear one-way bearing is fixed to the gripping member through the rear teeth member such that the driving member becomes a second state in which the driving member is not rotatable in the first rotation direction and is rotatable in the second rotation direction,
   in the second state, when the gripping member slides forwardly and backwardly in relation to the screw shaft, the screw shaft is driven to rotate in the second rotation direction in relation to the gripping member by the screw mechanism between the screw threads and the driving threads of the driving member since the driving member is not rotatable in the first rotation direction and the driving member rotates in the second rotation direction in relation to the screw shaft, thereby not driving the screw shaft to rotate in the first rotation direction.

2. The manual screw shaft driving device as claimed in claim 1, wherein the front teeth member has a plurality of teeth arranged around an outer peripheral surface of the outer ring of the front one-way bearing.

3. The manual screw shaft driving device as claimed in claim 1, wherein the rear teeth member has a plurality of teeth arranged around an outer peripheral surface of the outer ring of the rear one-way bearing.

4. The manual screw shaft driving device as claimed in claim 1, further comprising a front bearing and a rear bearing, wherein the front bearing is coaxially arranged in front of the front one-way bearing, the rear bearing is coaxially arranged behind the rear one-way bearing, and the driving member is provided passing through the sliding and rotating space in a manner of being supported by the front bearing and the rear bearing.

5. The manual screw shaft driving device as claimed in claim 1, wherein the driving member includes a front driving portion and a rear driving portion separated from each other, the inner ring of the front one-way bearing is fixedly fitted around an outer peripheral surface of the front driving portion, and the inner ring of the rear one-way bearing is fixedly fitted around an outer peripheral surface of the rear driving portion.

6. The manual screw shaft driving device as claimed in claim 5, further comprising a front bearing, a rear bearing and an intermediate bearing, wherein the front bearing is coaxially arranged in front of the front one-way bearing, the rear bearing is coaxially arranged behind the rear one-way bearing, the intermediate bearing is coaxially arranged between the front one-way bearing and the rear one-way bearing, the front driving portion is provided passing through the sliding and rotating space in a manner of being supported by the front bearing and the intermediate bearing, and the rear driving portion is provided passing through the sliding and rotating space in a manner of being supported by the intermediate bearing and the rear bearing.

7. The manual screw shaft driving device as claimed in claim 1, wherein the screw shaft is further provided with a cap portion fixed at a rear end of the screw shaft such that when the gripping member slides backwardly in relation to the screw shaft, the screw shaft is prevented from coming off from the gripping member by the cap portion forwardly pressing against the gripping member.

8. The manual screw shaft driving device as claimed in claim 1, wherein the driving direction switching member further includes a body, a pivot and a positioning element, the body has a first end and a second end opposite to the first end, the pivot and the positioning element are arranged between the first end and the second end, the positioning element is provided protruding from a bottom surface of the body, the pivot is connected to the gripping member such that the driving direction switching member is pivotally connected to the gripping member by the pivot, when the driving direction switching member is switched to the first switching position, the positioning element abuts against a rear groove formed in the gripping member to maintain the driving direction switching member in the first switching position, and when the driving direction switching member is switched to the second switching position, the positioning element abuts against a front groove formed in the gripping member to maintain the driving direction switching member in the second switching position.

9. The manual screw shaft driving device as claimed in claim 8, wherein the positioning element includes an elastic element and a ball.

\* \* \* \* \*